(12) United States Patent
Huynh et al.

(10) Patent No.: US 8,578,100 B1
(45) Date of Patent: Nov. 5, 2013

(54) DISK DRIVE FLUSHING WRITE DATA IN RESPONSE TO COMPUTED FLUSH TIME

(75) Inventors: Sang Huynh, Yorba Linda, CA (US); Ayberk Ozturk, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 354 days.

(21) Appl. No.: 12/941,519

(22) Filed: Nov. 8, 2010

(51) Int. Cl.
G06F 13/00 (2006.01)
G06F 13/28 (2006.01)

(52) U.S. Cl.
USPC .................. 711/135; 711/143; 711/E12.075

(58) Field of Classification Search
None
See application file for complete search history.

(56) References Cited

U.S. PATENT DOCUMENTS

| | | | |
|---|---|---|---|
| 5,418,940 A | 5/1995 | Mohan | |
| 5,797,022 A | 8/1998 | Shimotono et al. | |
| 5,895,488 A | 4/1999 | Loechel | |
| 6,191,712 B1 | 2/2001 | Still | |
| 6,412,045 B1 | 6/2002 | DeKoning et al. | |
| 6,924,952 B1 | 8/2005 | Brunnett et al. | |
| 6,925,526 B2 | 8/2005 | Hall | |
| 7,076,605 B1 | 7/2006 | Son | |
| 7,080,200 B2 | 7/2006 | Hassner et al. | |
| 7,277,986 B2 | 10/2007 | Morley et al. | |
| 7,574,558 B2 | 8/2009 | Morley et al. | |
| 8,041,904 B2 * | 10/2011 | Ergan et al. ................... | 711/154 |
| 2006/0117137 A1 * | 6/2006 | Matsuba et al. ............... | 711/113 |
| 2008/0005465 A1 | 1/2008 | Matthews | |
| 2008/0005467 A1 | 1/2008 | Morley et al. | |
| 2009/0021853 A1 | 1/2009 | Park | |
| 2010/0011168 A1 | 1/2010 | Ryu et al. | |
| 2010/0079904 A1 | 4/2010 | Sato | |

FOREIGN PATENT DOCUMENTS

KR   0303217 B1   7/2001

* cited by examiner

Primary Examiner — Matthew Bradley
Assistant Examiner — Eric S Cardwell

(57) ABSTRACT

A disk drive is disclosed comprising a head actuated over a disk, a volatile semiconductor memory (VSM), and a command queue. A plurality of write commands received from a host are stored in the command queue, and write data for the write commands is stored in the VSM. A flush time needed to flush the write data from the VSM to the disk is computed, and the write data is flushed from the VSM to a non-volatile memory (NVM) in response to the flush time.

16 Claims, 5 Drawing Sheets

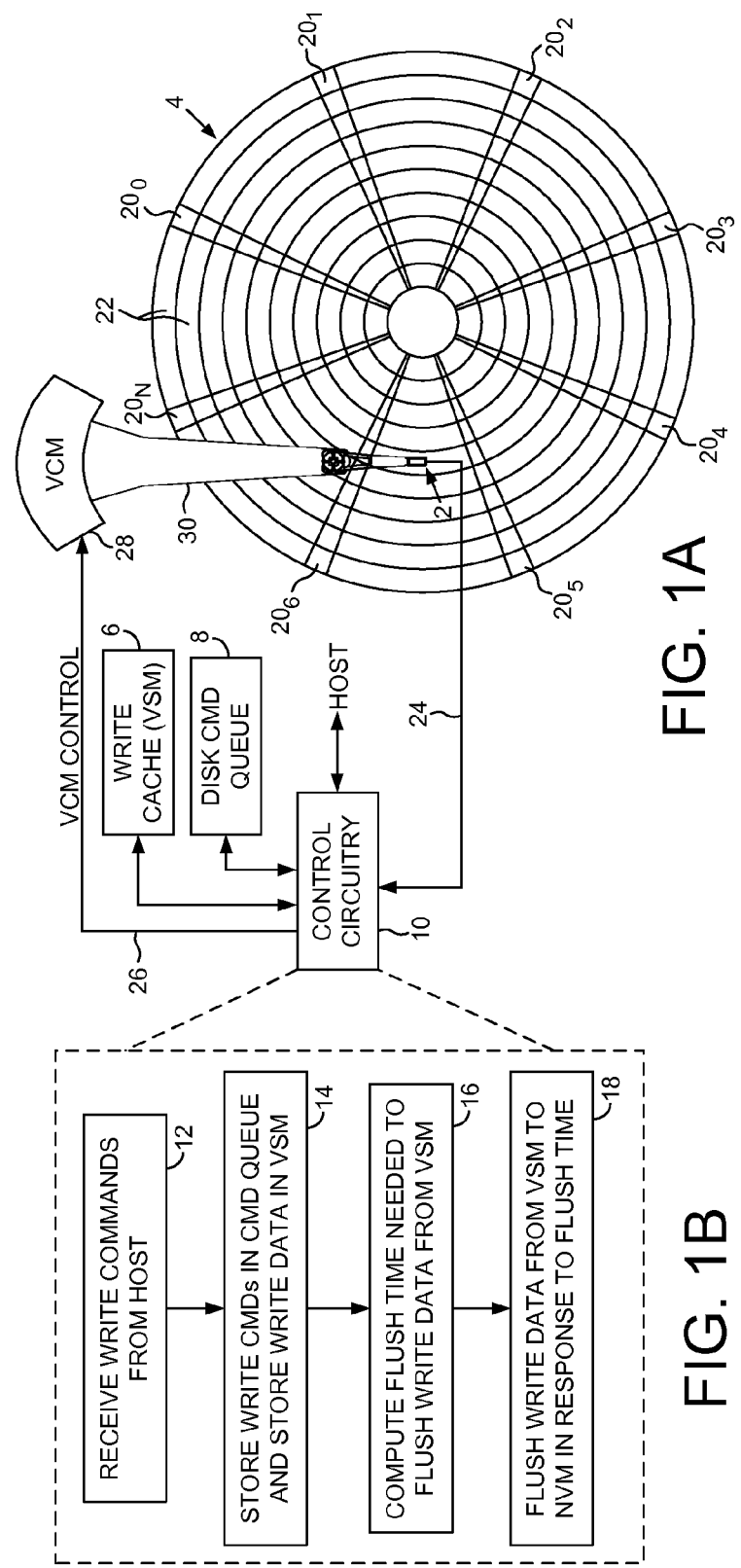

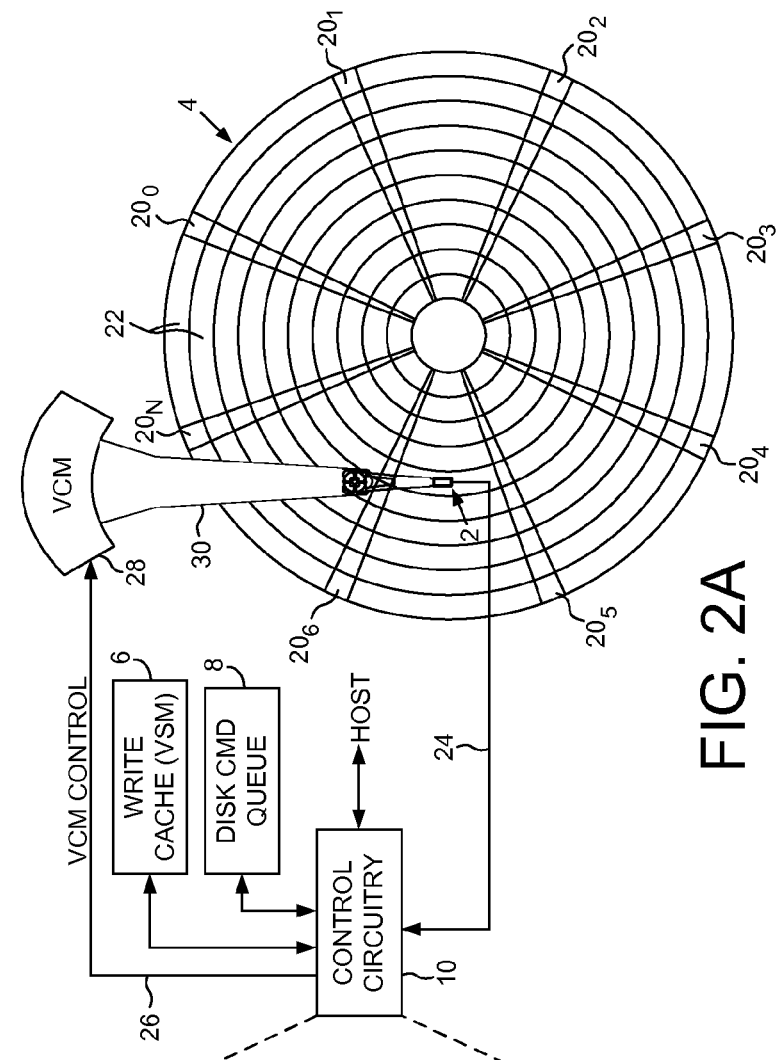
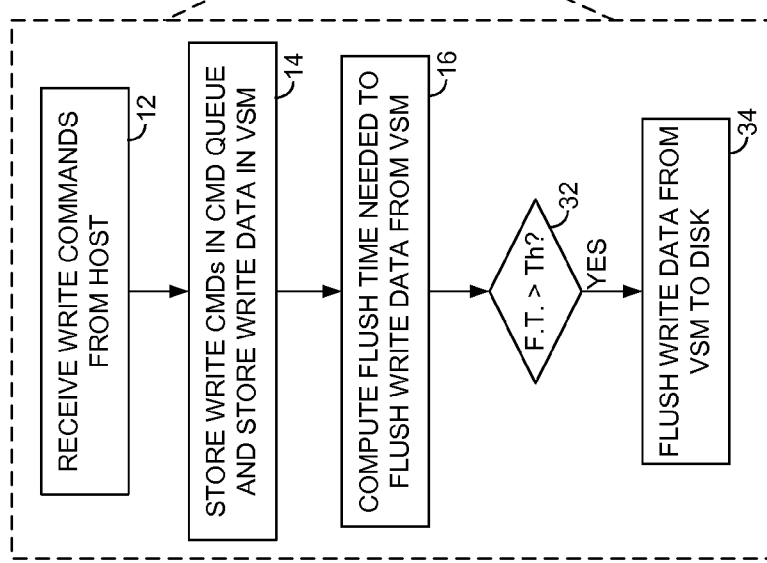
FIG. 2A
FIG. 2B

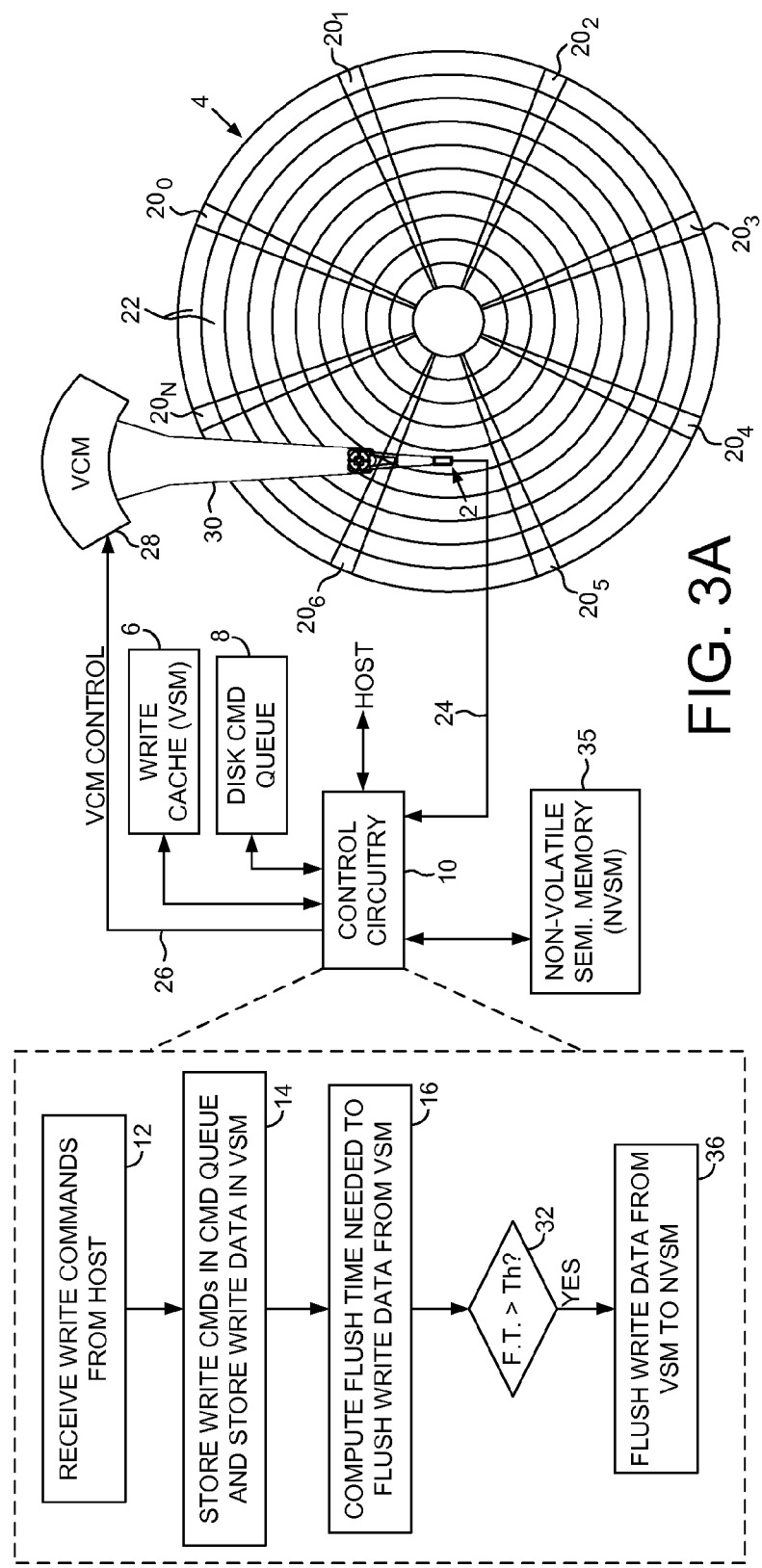

DISK DRIVE FLUSHING WRITE DATA IN RESPONSE TO COMPUTED FLUSH TIME

BACKGROUND

Description of the Related Art

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the velocity of the actuator arm as it seeks from track to track.

Disk drives may comprise a volatile semiconductor memory for caching user data before it is written to the disk. This improves performance of the disk drive as seen by the host since the disk drive can immediately return a "ready" status in response to a write command rather than require the host to wait until the user data has been written to the disk. The write data stored in the write cache is flushed to the disk at a later time, such as during an idle mode or when a flush command is received from the host. Deferring the flushing of write data from a write cache to the disk is typically referred to as write-back caching.

BRIEF DESCRIPTION OF THE DRAWINGS

FIG. 1A shows a disk drive according to an embodiment of the present invention comprising a head actuated over a disk and a volatile semiconductor memory (VSM).

FIG. 1B is a flow diagram according to an embodiment of the present invention wherein a flush time needed to flush the write data from the VSM is computed.

FIGS. 2A and 2B show an embodiment of the present invention wherein when the flush time exceeds a threshold, at least part of the write data stored in the VSM is flushed to the disk.

FIGS. 3A and 3B show an embodiment of the present invention wherein when the flush time exceeds a threshold, at least part of the write data stored in the VSM is flushed to a non-volatile semiconductor memory (NVSM).

DETAILED DESCRIPTION OF EMBODIMENTS OF THE INVENTION

Figure 4:
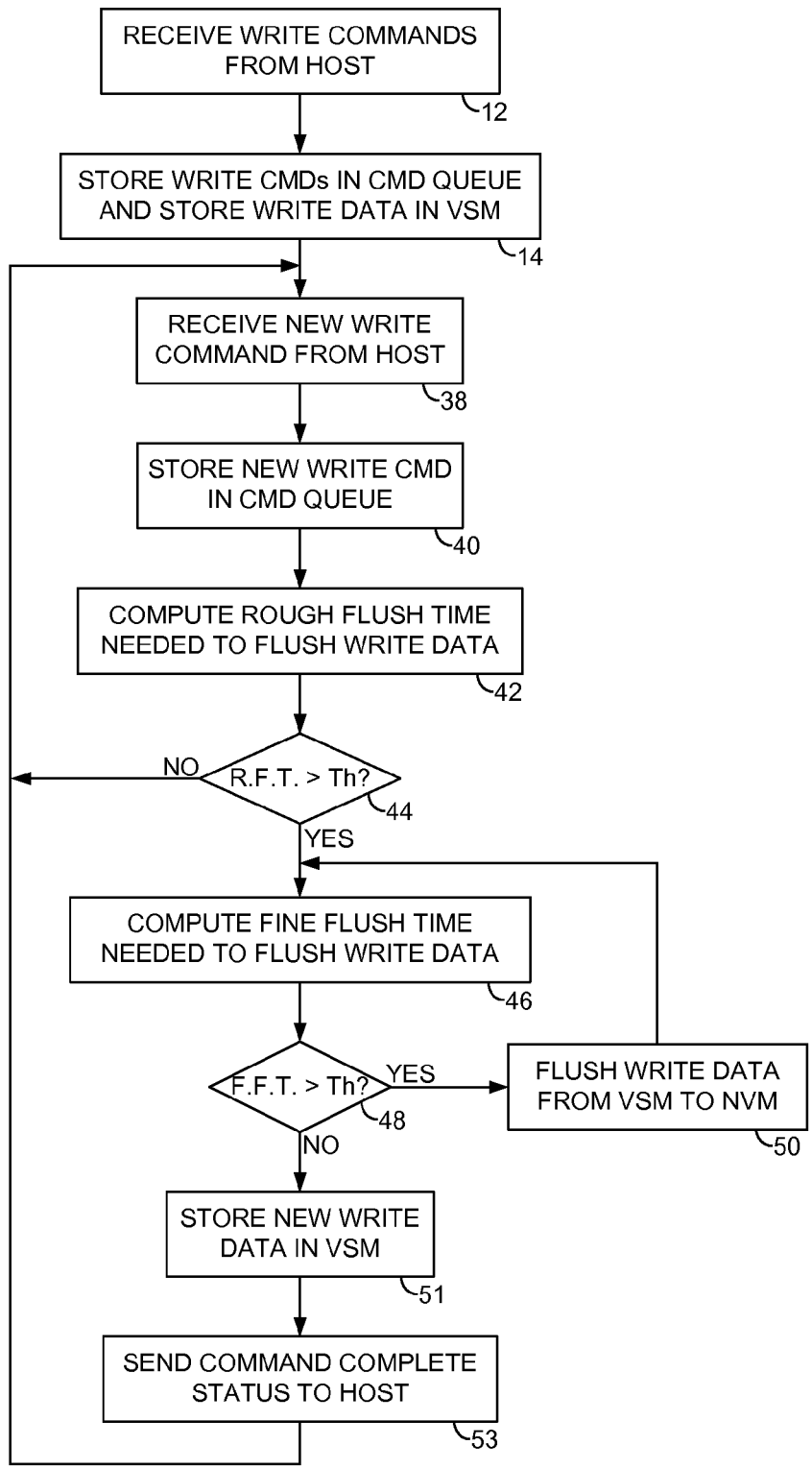
FIG. 4 is a flow diagram according to an embodiment of the present invention wherein when a new write command is received from the host, a rough flush time is computed, and when the rough flush time exceeds a threshold, a fine flush time is computed and used to flush write data from the VSM.

FIG. 1A shows a disk drive according to an embodiment of the present invention comprising a head 2 actuated over a disk 4, a volatile semiconductor memory (VSM) 6, and a command queue 8. The disk drive further comprises control circuitry 10 operable to execute the flow diagram of FIG. 1B, wherein a plurality of write commands received from a host (step 12) are stored in the command queue, and write data for the write commands is stored in the VSM (step 14). A flush time needed to flush the write data from the VSM to the disk is computed (step 16), and the write data is flushed from the VSM to a non-volatile memory (NVM) in response to the flush time (step 18).

In the disk drive of FIG. 1A, a plurality of embedded servo sectors $20_0$-$20_N$ are recorded on the disk 4 to define a plurality of data tracks 22 each comprising a number of data sectors. Each servo sector comprises suitable position information, such as a track address providing coarse position information and servo bursts providing fine position information. As the head 2 passes over a servo sector, the control circuitry 10 demodulates a read signal 24 emanating from the head into a position error signal (PES). The PES is filtered by a suitable compensation filter to generate a control signal 26 applied to a voice coil motor (VCM) 28. The VCM 28 rotates an actuator arm 30 about a pivot in order to position the head 2 radially over the disk 4 in a direction that reduces the PES.

In one embodiment, the write data cached in the VSM may be flushed to the disk during an idle time (not processing host commands). Alternatively, the host may transmit a command to the disk drive requesting that the cached write data be flushed immediately to the disk. The command received from the host may be a flush command, or a reset command, or any other command that requires the write data be flushed from the VSM. However, if the time required to flush the write data from the VSM exceeds a threshold, the host may time-out waiting for the disk drive to finish the flush operation. That is, an error will be generated at the host if the flush time causes the host command to time-out. Accordingly, in embodiments of the present invention the flush time is computed and used to flush the write data in a manner that prevents the host from timing out.

The flush time may be used in any suitable manner in order to reduce the likelihood of the host timing out. FIGS. 2A and 2B show an embodiment of the present invention wherein when the flush time exceeds a threshold (step 32) at least part of the write data is flushed from the VSM to the disk (step 34). This embodiment ensures the write data in the VSM can be flushed to the disk within a time limit that ensures the host will not time out. Any suitable threshold may be employed at step 32, such as a general threshold that prevents any type of host from timing out. In another embodiment, the threshold may be configured to a specific value based on the type of host accessing the disk drive, and in another embodiment the host itself may configure the threshold.

FIGS. 3A and 3B show an embodiment of the present invention wherein the disk drive further comprises a non-volatile semiconductor memory 35, such as any suitable electrically erasable/programmable memory (e.g., a Flash memory). If the disk drive is experiencing a high work load of disk access commands and the flush time of the write data stored in the VSM exceeds a threshold (step 32), at least part of the write data is flushed to the NVSM (step 36). This embodiment ensures the write data is flushed to a non-volatile memory without interrupting the disk access commands. In one embodiment, the write data flushed to the NVSM is relocated to the NVSM so that future read commands are serviced by the NVSM. In an alternative embodiment, the write data flushed to the NVSM is eventually flushed to the disk in order to free up space in the NVSM.

Any suitable factors may be evaluated in order to compute the flush time of the write data stored in the VSM. In one embodiment, each write command pending in the command queue is evaluated to estimate the time needed to flush the corresponding write data. For example, the number of consecutive data sectors in a write command affects how much time it will take to execute the write command. Other factors may be whether a write command includes relocated data sectors which may require a seek to a data track comprising a corresponding spare data sector. Yet another factor that may be considered is whether a write verify operation is required for each write command. With a write verify operation, after writing the data to a data track the control circuitry expends at least one additional revolution in order to read the same data track and verify recoverability of the data sectors. Additionally, if one or more of the data sectors has been marked as a marginal data sector, the write verify operation may perform multiple reads of the marginal data sectors to ensure recoverability which requires multiple disk revolutions. In other embodiments, environmental factors may be evaluated to compute the time required to flush the write data, such as the current ambient temperature, current pressure, or whether vibrations are affecting the disk drive, all of which can affect the time required to execute write operations to the disk.

In one embodiment, the block size of the host commands may be disparate from the physical size of the data sectors. For example, a host block size may be 512 bytes whereas the physical size of a data sector may be 2k or 8k bytes. Consequently, the boundary of a write command (beginning and/or end) may not align with the physical boundary of a data sector. When this happens, the boundary data sector is written using a read-modify-write operation in order to read the fraction of the data sector that is not being overwritten. The read-modify-write operation requires at least one additional disk revolution which increases the execution time of a write command.

The flush time of write data cached in the VSM may be computed at any suitable time during operation of the disk drive. In one embodiment, the flush time may be computed during an idle time of the disk drive. If the flush time exceeds a threshold, at least part of the write data may be flushed to the disk during the idle time. If the flush time does not exceed the threshold, the control circuitry may perform other background operations, such as executing a refresh operation to refresh data written on the disk.

In another embodiment, the flush time of the write data cached in the VSM may be computed each time a new write command is received from the host. When the disk drive is in a high workload environment, it is desirable to compute the flush time as quickly as possible so that computational bandwidth may be better used to service the host access commands. Accordingly, in an embodiment illustrated in the flow diagram of FIG. 4, when a new write command is received from the host (step 38), the new write command is stored in the command queue prior to receiving the write data for the new write command (step 40). A rough flush time is then computed (step 42) which provides a rough estimate as to the actual flush time needed to flush the write data of the pending write commands to the disk. If the rough flush time exceeds a threshold (step 44), a fine flush time is computed that provides a more accurate estimate of the flush time by evaluating additional factors, but also increases the computation time (step 46). If the fine flush time exceeds a threshold (step 48), then at least part of the write data cached in the VSM is flushed to a NVM, such as the disk and/or the NVSM (step 50).

The process is repeated starting at step 46 until enough of the write data has been flushed so that the fine flush time falls below the threshold at step 48. The write data for the new write command is then received from the host and stored in the VSM (step 51), and a command complete status is returned to the host (step 53). The write command(s) selected from the command queue to flush to the NVM may be selected in any suitable manner, such as the write command that minimizes the access latency, or the write command that most reduces the flush time for the remaining write data, or a combination of these or other factors.

Any suitable additional factors may be considered when computing the fine flush time, such as the seek latency of the head and rotational latency of the disk associated with each pending write command in the command queue as determined from a rotational position optimization (RPO) algorithm. In one embodiment, the rough flush time may be computed with a margin that assumes worst case parameters for the fine flush time (e.g., worst case latency that may be computed by the RPO algorithm). The fine flush time is then computed to verify the need to flush at least part of the write data, or that the flush operation may be deferred.

Figure 5:
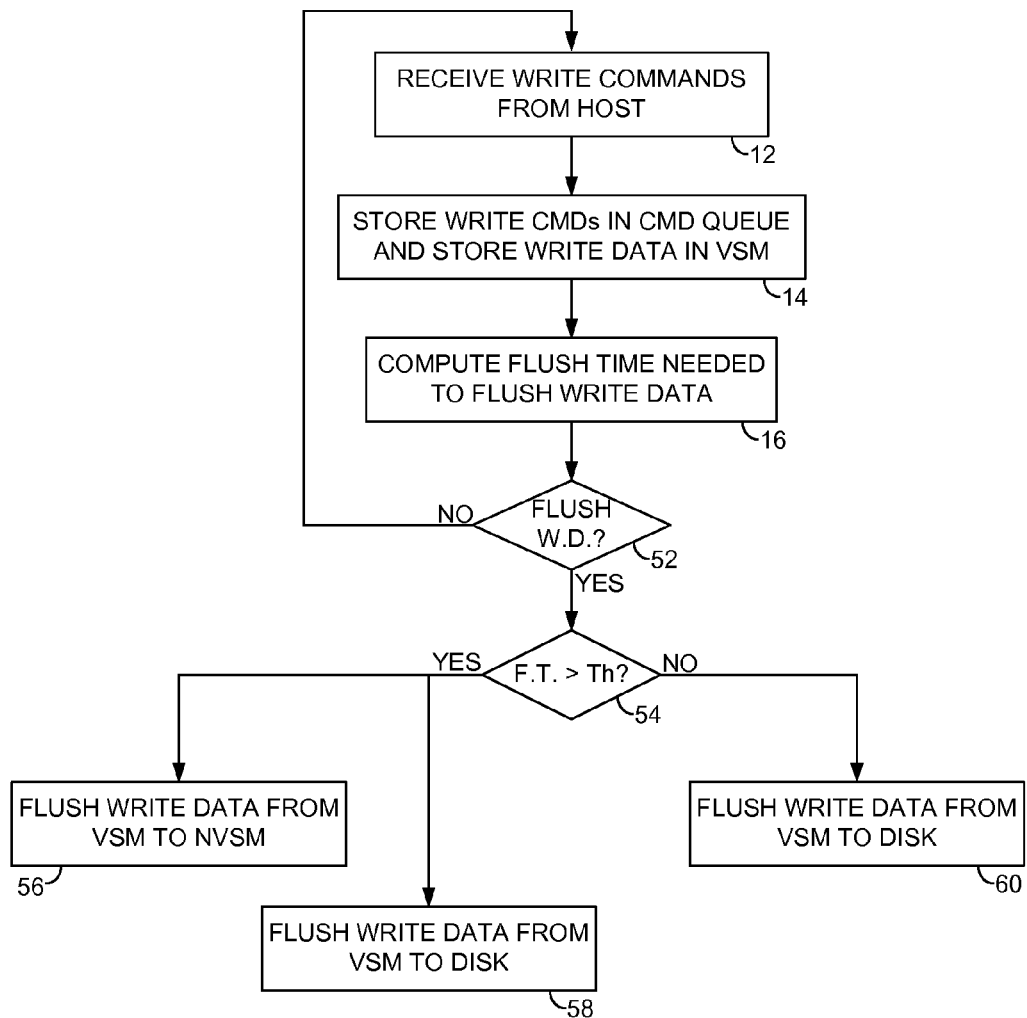
FIG. 5 is a flow diagram according to an embodiment of the present invention wherein when a host command is received requiring the write data to be flushed, and the computed flush time exceeds a threshold, a first part of the write data is flushed to a NVSM and a second part of the write data is flushed to the disk.

FIG. 5 is a flow diagram according to an embodiment of the present invention wherein after receiving a plurality of write commands (step 12), caching the write data in the VSM (step 14), and computing the flush time for the write data (step 16), a command may be received from the host that requires the write data to be flushed to a NVM (step 52). For example, the host command may be a flush command, or a reset command that requires the write data be flushed from the VSM. If the flush time exceeds a threshold when the command is received (step 54), a first part of the write data is flushed to a NVSM (step 56) and a second part of the write data is flushed to the disk (step 58). In one embodiment, a number of write commands are selected to be serviced by the disk that corresponds to the maximum flush time before the host may time out. The remaining write data may then be flushed to the NVSM. In another embodiment, the write data is flushed concurrently to both the NVSM and the disk in order to ensure the actual flush time does not exceed the threshold associated with a host time-out. If the flush time does not exceed a threshold at step 54, the write data is flushed only to the disk (step 60) in order to reduce write amplification of the NVSM thereby increasing the life of the NVSM.

Another embodiment of the present invention may combine aspects of the embodiment shown in FIG. 4 with the embodiment shown in FIG. 5. For example, a first threshold may be used to determine whether the NVSM should assist with the flush operation when a host command is received that requires the write data be flushed. A second, higher threshold may be employed to force a flush of at least part of the write data when the flush time exceeds the second threshold. That is, the flush time may saturate both the NVSM and the disk when reaching the second threshold, and therefore at least part of the write data is flushed (to either or both the NVSM and the disk) to ensure the host does not time out when a host command is received that requires all of the write data be flushed.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
a disk;
a head actuated over the disk;
a volatile semiconductor memory (VSM);
a command queue; and
control circuitry operable to:
  receive a plurality of write commands from a host;
  store the write commands in the command queue;
  store write data for the write commands in the VSM;
  compute a flush time needed to flush the write data from the VSM to the disk; and
  flush at least part of the write data from the VSM to a non-volatile memory (NVM) in response to the flush time.

2. The disk drive as recited in claim 1, wherein the control circuitry is operable to flush the write data from the VSM to the NVM when the flush time exceeds a threshold.

3. The disk drive as recited in claim 1, wherein the control circuitry is operable to compute the flush time when a new write command is received from the host.

4. The disk drive as recited in claim 1, wherein the NVM comprises the disk.

5. The disk drive as recited in claim 1, wherein the NVM comprises a non-volatile semiconductor memory (NVSM).

6. The disk drive as recited in claim 1, wherein the control circuitry is further operable to:
  compute a rough flush time needed to flush the write data from the VSM to the disk;
  when the rough flush time exceeds a threshold, compute a fine flush time needed to flush the write data from the VSM to the disk; and
  flush the write data from the VSM to the NVM in response to the fine flush time.

7. The disk drive as recited in claim 6, wherein the rough flush time provides a rough estimate of an actual flush time needed to flush the write data from the VSM to the disk.

8. The disk drive as recited in claim 5, wherein the control circuitry is further operable to:
  receive a command from the host requiring the write data to be flushed from the VSM to the NVM; and
  when the flush time exceeds the threshold, flush a first part of the write data from the VSM to the NVSM and flush a second part of the write data to the disk.

9. A method of operating a disk drive comprising a head actuated over a disk, a volatile semiconductor memory (VSM), and a command queue, the method comprising:
  receiving a plurality of write commands from a host;
  storing the write commands in the command queue;
  storing write data for the write commands in the VSM;
  computing a flush time needed to flush the write data from the VSM to the disk; and
  flushing at least part of the write data from the VSM to a non-volatile memory (NVM) in response to the flush time.

10. The method as recited in claim 9, wherein the write data is flushed from the VSM to the NVM when the flush time exceeds a threshold.

11. The method as recited in claim 9, wherein the flush time is computed when a new write command is received from the host.

12. The method as recited in claim 9, wherein the NVM comprises the disk.

13. The method as recited in claim 9, wherein the NVM comprises a non-volatile semiconductor memory (NVSM).

14. The method as recited in claim 9, further comprising:
  computing a rough flush time needed to flush the write data from the VSM to the disk;
  when the rough flush time exceeds a threshold, computing a fine flush time needed to flush the write data from the VSM to the disk; and
  flushing the write data from the VSM to the NVM in response to the fine flush time.

15. The method as recited in claim 14, wherein the rough flush time provides a rough estimate of an actual flush time needed to flush the write data from the VSM to the disk.

16. The method as recited in claim 13, further comprising:
  receiving a command from the host requiring the write data to be flushed from the VSM to the NVM; and
  when the flush time exceeds the threshold, flushing a first part of the write data from the VSM to the NVSM and flushing a second part of the write data to the disk.

* * * * *